United States Patent Office 3,039,326
Patented June 19, 1962

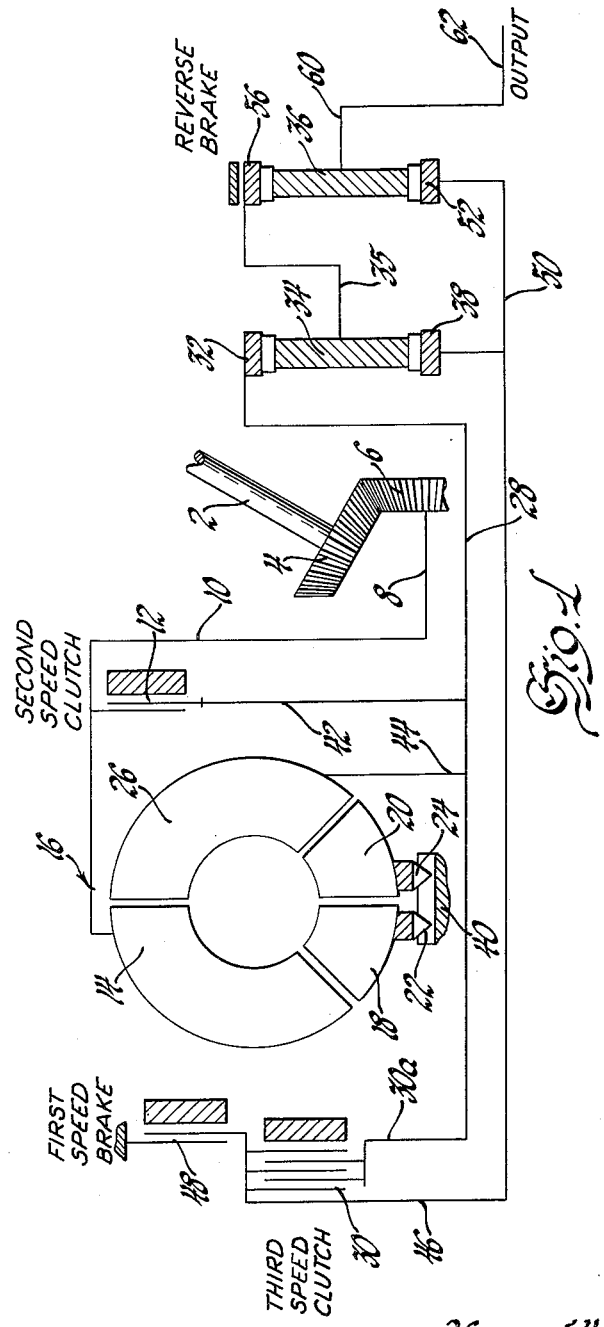

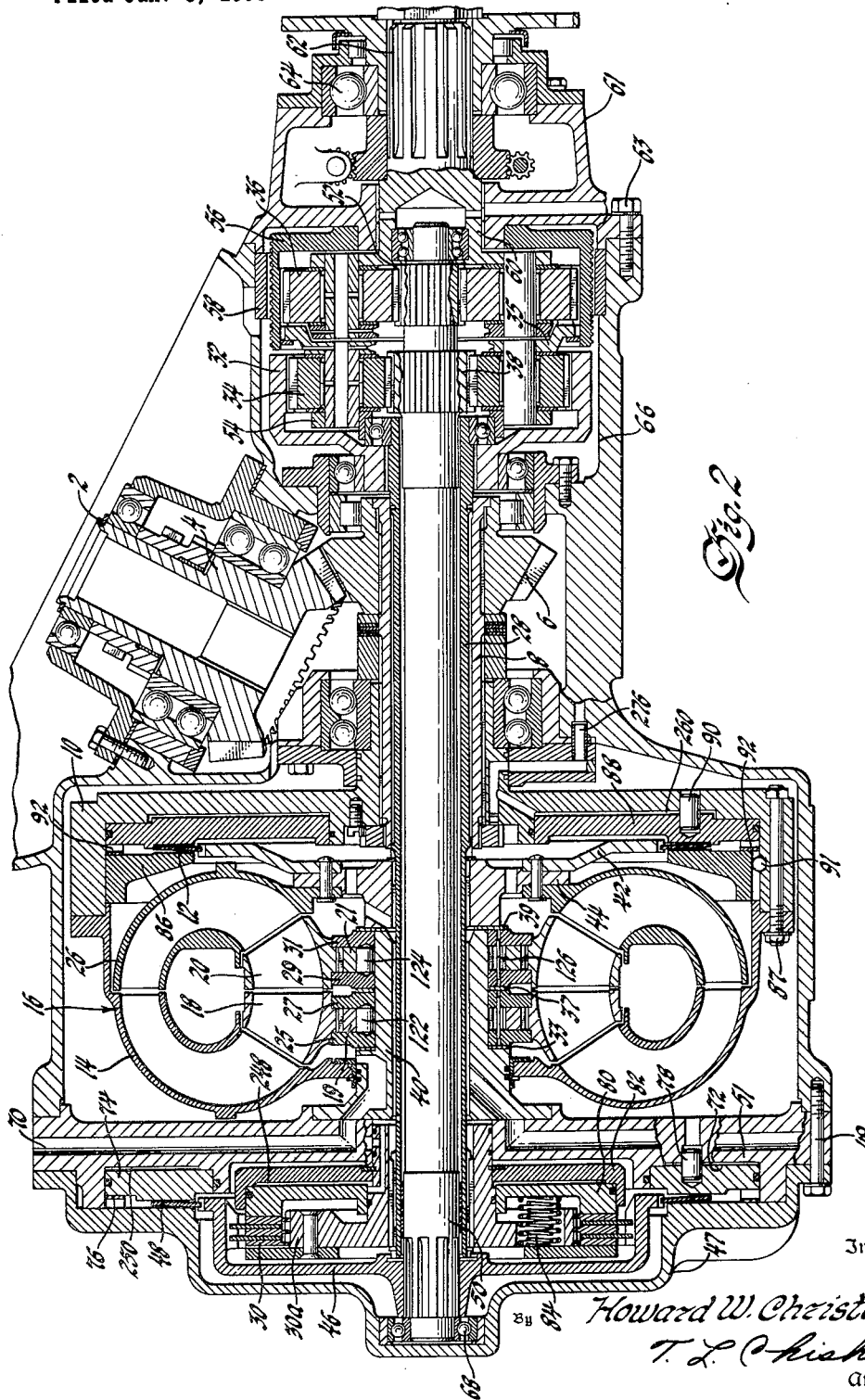

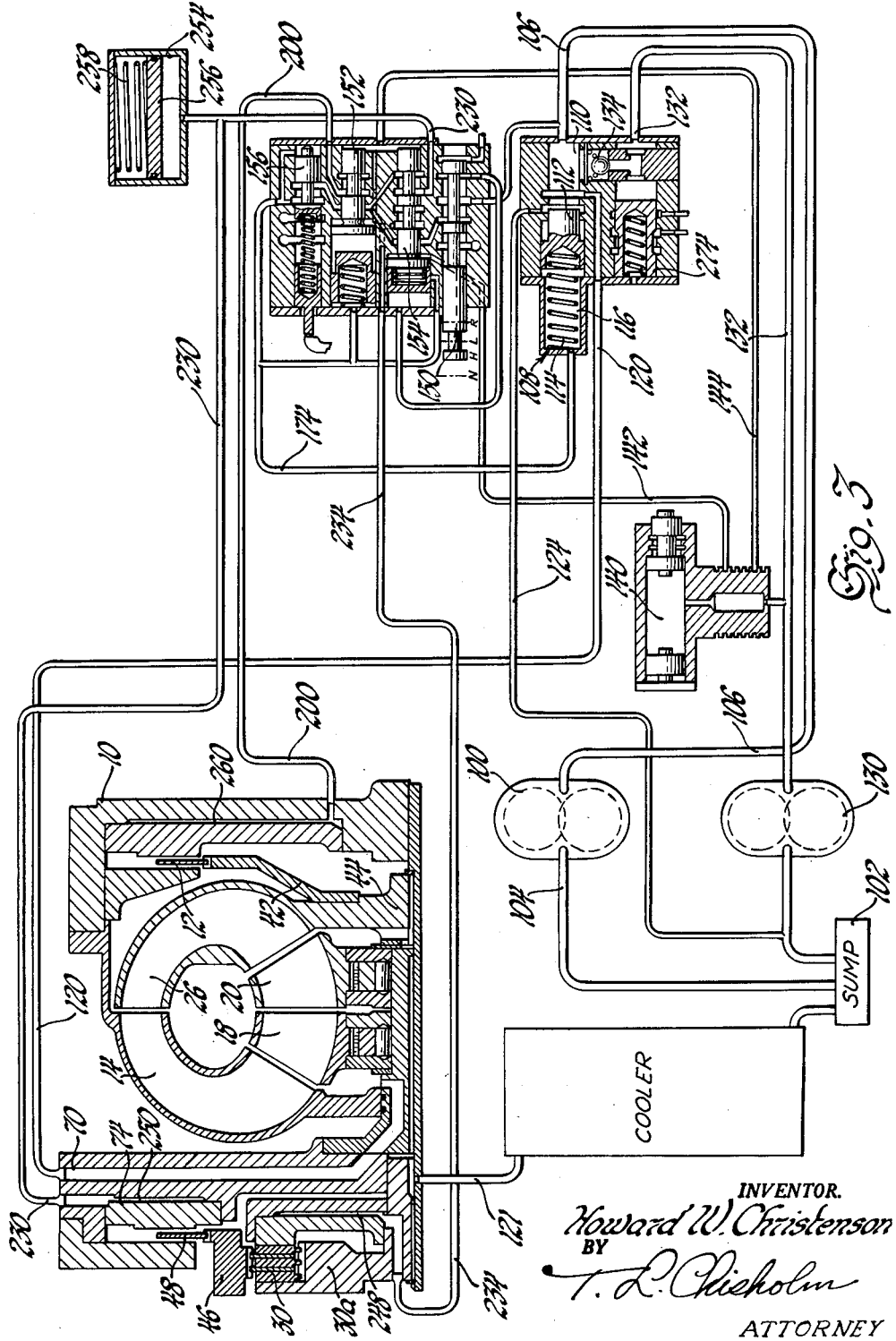

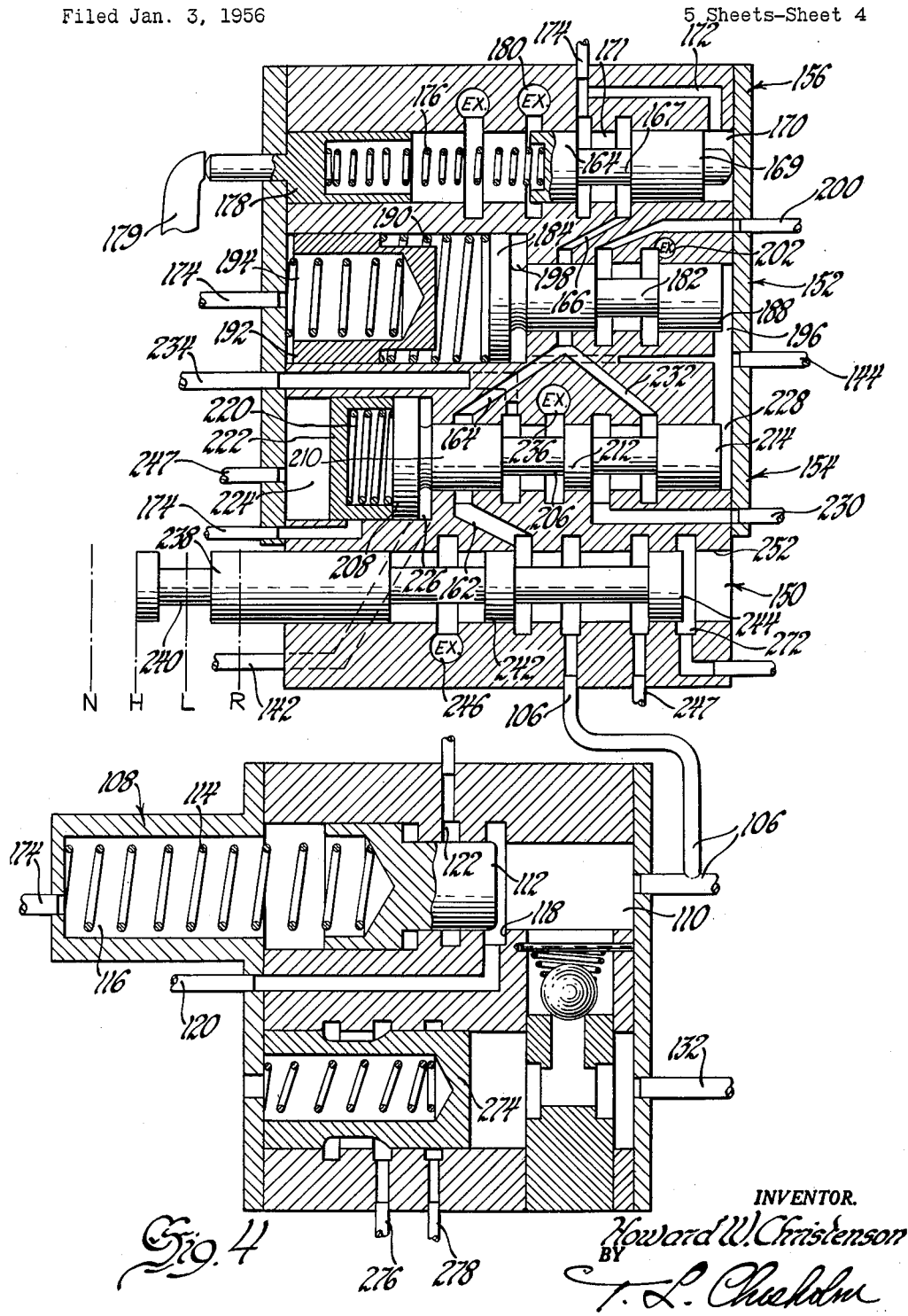

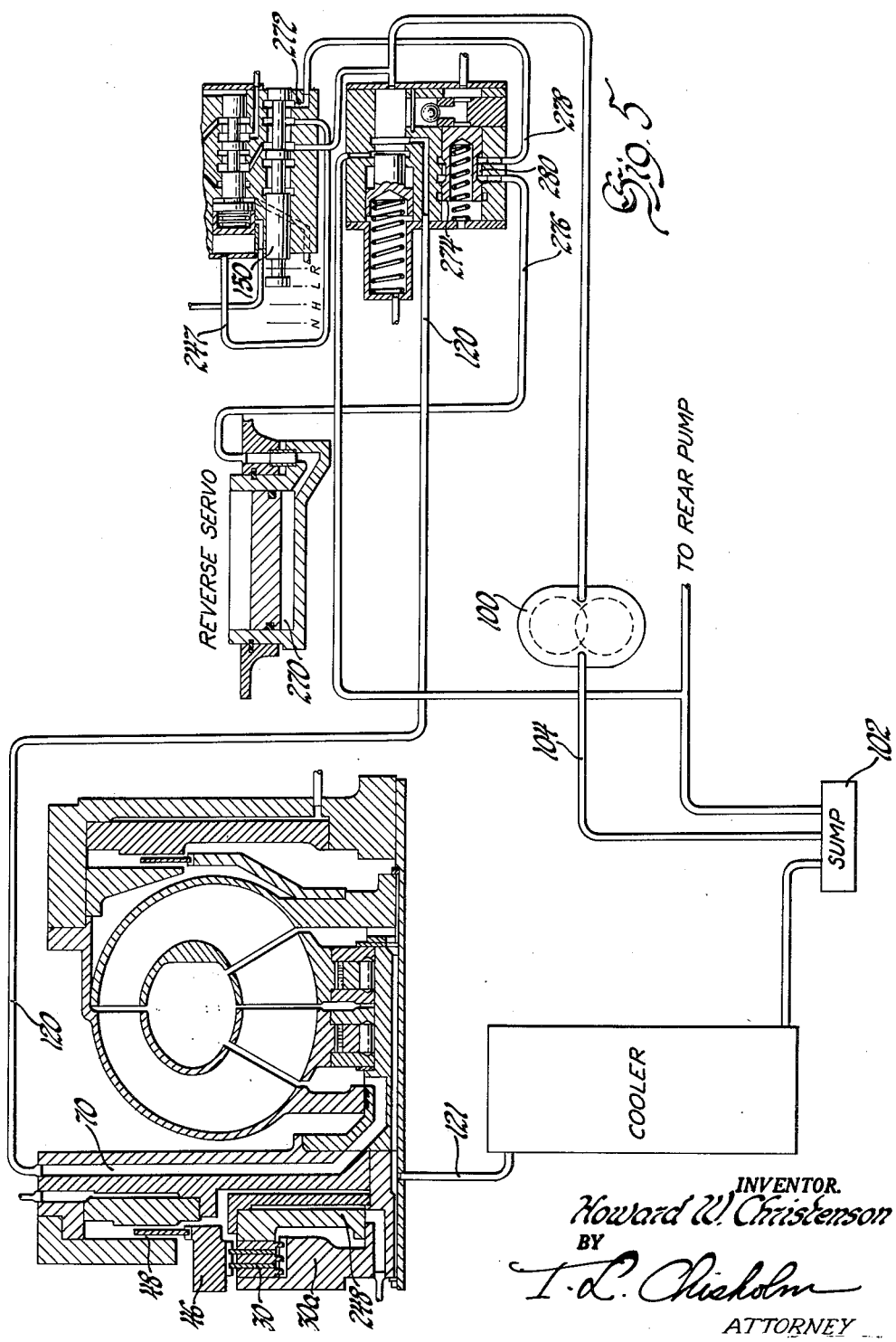

3,039,326
TRANSMISSION
Howard W. Christenson, 128 W. 73rd St.,
Indianapolis, Ind.
Filed Jan. 3, 1956, Ser. No. 557,129
7 Claims. (Cl. 74—688)

This invention relates to a power transmission in which a hydro-kinetic torque converter drives change speed gearing which can be changed automatically. It is particularly, but not exclusively, adapted to be used in transmissions for automotive vehicles, especially in angle drives in which the axis of the transmission is at an angle to the axis of the engine, and the invention will be described as applied to such use, for illustration only.

This application is a continuation-in-part of my application, Serial Number 132,388, filed December 10, 1949, which matured into Patent 2,734,399.

In the past certain difficulties have been encountered in attempts to combine torque converter drives with automatic shifting change speed gearing. These prior transmissions have usually been quite complex and difficult to service. Many of these torque converter change speed transmission combinations have been expensive to operate because of inherent hydraulic losses in the torque converter, when this was in the power train.

It is therefore among the objects of the invention to provide an improved and simplified construction of, and control system for, a torque converter driving change speed gearing, the ratio of the gear being changed automatically in response to speed and load conditions of the vehicle; to provide an improved arrangement of planetary change speed gearing driven by the torque converter whereby both hydraulic and mechanical speed reduction are obtained; to provide improved arrangements for locking up the torque converter and for locking up the planetary gearing, one advantage of this being to obtain a low range of speed ratios, both forward and reverse as well as two higher definite or step speed ratios forward; to provide an improved and simple control system by which the transmission can, at will, either be confined to the low range, or arranged to shift automatically through the entire range of ratios; and to provide an improved and simplified construction which is economical to manufacture and easy to repair.

Other objects and advantages of this invention will be apparent in the specification and annexed drawings, in which:

FIG. 1 is a schematic illustration of a transmission embodying one form of the invention, FIG. 2 is a longitudinal section of one example of actual structure of a transmission embodying the form of the invention shown in FIG. 1, FIG. 3 is a schematic ilustration of one form of control system for operating the transmission of FIGS. 1 and 2, the transmission being shown in low range, and some parts of the reverse drive devices being omitted, FIG. 4 is an enlarged diagrammatic illustration of the control valves shown in FIG. 3, and FIG. 5 is a diagrammatic illustration of the control system in reverse, some parts of the forward drive devices being omitted.

Referring to FIG. 1 an engine shaft 2 is fixed to a beveled gear 4, meshing with a beveled gear 6, connected to input shaft 8, fixed to drum 10, which carries both the driving part of lockup or direct drive clutch 12 and the impeller 14 of a hydrodynamic torque converter 16. The torque converter may have the customary reaction members 18 and 20 supported for forward rotation only by one-way devices represented diagrammatically by the blades 22 and 24 which are regarded as fixed to the respective reaction members and as overlapping a ground member 40 fixed to the casing of the transmission. This symbolic device indicates that the reaction members can be rotated toward the eye of the observer, but are prevented from rotating in the opposite sense by the ground member which blocks the blades.

The torque converter turbine 26 is connected to the torque converter output shaft 28 by flange 44, to which is secured a second flange 42, to which is splined the driven plate of the clutch 12 by which the shaft 28 may at times be fixed to rotate with the input shaft 8. The torque converter output shaft 28 is also an input shaft for planetary change speed and reverse gearing which latter includes a front planetary unit which has an input ring gear 32 formed on a drum keyed to shaft 28, has planet pinions 34 mounted on a carrier 35 and has a reaction sun gear 38 keyed to a reaction shaft 50 adjacent its rear end. Carrier 35 is splined to the input ring gear 56 of a second planetary unit which has a reaction sun gear 52 also fixed to reaction shaft 50 and has planet pinions 36 mounted on a second carrier 60 which may be formed integral with the output shaft 62. The reaction shaft 50 is keyed at its front end to a brake and clutch drum 46. The drum has splined to it one part or plate of a low range brake 48 and the driven plates of a planetary gear lockup clutch 30, the driving plates of which are splined to a flange 30a keyed to the torque converter output shaft 28. By this arrangement the reaction sun gears 38 and 52 may be either held fixed by the brake 48 or may be driven by the torque converter output shaft 28.

The transmission, so far described, operates as follows:

For low speed, the low range brake 48 is set to hold both reaction sun gears 38 and 52 and clutches 12 and 30 are disengaged by manual and automatic devices to be described. Rotation of the engine shaft 2 drives the torque converter to rotate the torque converter output shaft 28 at the range of speed ratios which are inherent in the torque converter. This drives the carrier 34 forward at reduced speed, and the carrier 34 rotating ring gear 56, drives carrier 60 and output shaft 62 at a still slower speed.

For high range the torque converter is locked up by the engagement of clutch 12 and at first the low range brake 48 remains engaged. This drives the input ring gear 32 at the speed of input gear 6 which is faster than the torque converter can drive it in low speed. This effects second speed, the output shaft 62 being driven by the planetary gearing as before described. When predetermined speed and load conditions of the vehicle are reached the automatic control system disengages brake 48 and engages clutch 30. This locks up the planetary gearing so that the output shaft is driven directly by beveled gear 6. This constitutes third speed.

For reverse, ring gear 56 is held by a reverse brake 58 while low brake 38 and both clutches are released. This holds carrier 34 so that ring 32 driven by the torque converter drives suns 38 and 52 backward, which drives carrier 60 and output shaft 62 forward.

Structure

The foregoing description and reference characters apply to the actual structure shown in FIG. 2, except that instead of the symbolic one-way devices 22 and 24 actual one-way brakes are shown in which hubs or races 19 and 21 are fixed to the reaction members 18 and 20, respectively, between flanges 25—27 and 29—31, respectively. Between each pair of flanges one-way rollers or sprags 122 and 124, respectively, support the races for forward rotation only, as is known in the art.

In addition to the apparatus previously described, FIG. 2 shows the following parts:

In the one-way brake assembly, thrust washers 33, 37 and 39 are placed between the casing and flange 25, between flanges 27 and 29 and between the flange 31 and the flange 44. The output shaft 62 is mounted in a rear bearing retainer 61, supporting an anti-friction bearing 64 and removably secured to the principal housing or casing 66 by bolts 63. This arrangement provides ready access to the planetary gearing and makes easy the removal and replacement of parts without removing the transmission from the vehicle. At the front end of the transmission a cover plate 47, secured to the casing 66 by bolts 49, carries a central anti-friction bearing 68 for the front end of the reaction shaft 50. Between the cover plate 47 and the main housing 64 is a reaction plate 51 to which the reaction or ground sleeve 40 is fixed, and in which passage 70 is formed to conduct oil to the converter, as will be explained. A cylinder 72 is formed in the reaction plate 51 and a piston 74 forms with the cylinder an expansible chamber 250. When fluid under pressure is admitted to this chamber, as will be explained, the piston 74 presses the driven plate of the brake 48 against cover plate 47 which latter forms the ground member of the brake 48. A waved return spring 76 of known form releases the brake when pressure is relieved in the chamber 250. A dowel 78 prevents rotation of the piston.

The clutch 30 is operated by a piston 80 in a cylinder 82 carried by the clutch flange 30a. This piston and cylinder form an expansible chamber 248, which when fluid under pressure is supplied to it, moves the piston to the left against the force of return springs 84 to set the clutch 30.

The converter drum 10 forms a cylinder in which is fixed a backing plate 86, forming the driving member of the direct drive clutch 12. The shell of the impeller 14 is secured to the drum 10 by bolts 87. This holds the backing plate 86 in place against a snap ring 89, and a key 91 prevents relative rotation of the drum and backing plate. A piston 88 held by dowel 90 forms with the cylinder an expansible chamber 260, which under the influence of fluid pressure will set the clutch 12 against the force of a waved releasing spring 92 of known form.

The clutch 30 and brake 48 with their associated parts may be reached for replacement by simply removing bolts 49 and cover plate 47. Then the torque converter becomes accessible by removing reaction plate 51. Removal of bolts 87 gives access to the over-running brakes of the reaction members and to the clutch 12. All this promotes easy servicing of the entire transmission and replacement of all principal parts without removal of the transmission from the vehicle.

*Control*

FIG. 3 shows the control system diagrammatically in the low range position. A front pump 100 driven by the engine draws oil from a sump 102 by intake conduit 104 and delivers it under pressure through main line 106 to a pressure regulating valve 108 (best shown in FIG. 4) where the oil enters regulating chamber 110 which maintains a substantially constant pressure (if the engine throttle opening is constant, as will be explained). This is achieved by valve plunger 112, which the pressure in chamber 110 urges to the left as FIGS. 3 and 4 are seen, against the force of a restoring spring 114 in a chamber 116. When the pressure in chamber 110 reaches a predetermined value the valve 112 uncovers port 118 to spill excess oil to a converter charging and lubrication conduit 120, and this tends to keep the pressure in chamber 110 and the main line 106 constant. Conduit 120 is connected to the converter charging passage 70 previously described in connection with FIG. 2 and maintains the converter filled with oil, as is known. Oil is discharged from the converter through lubricating passages for the transmission in any suitable known manner, and returns to the sump by conduit 121, through any suitable cooler if desired. The inherent restriction of the lubrication pasages together with regulator valve 112 maintains pressure in the converter below the pressure of line 106. If the lubrication system does not spill enough oil from the chamber 110 to keep the pressure in line 106 low enough, the pressure tends to move valve 112 further to the left until it uncovers vent port 122, and this spills more oil from the regulating chamber directly to the sump through conduit 124. This maintains the line pressure constant for any given throttle opening.

A rear pump 130 driven from the output shaft 62 draws oil from the sump and delivers it to a rear pump outlet 132 which can connect with the pressure regulating chamber 110 through check valve 134. If the engine is running the front pump can maintain a higher pressure than the rear pump and holds the check valve 134 closed, but if the engine is not running the rear pump opens the check valve to supply main line 106 and the control system. The rear pump supplies oil to a governor 140 which may be constructed and may operate as described in the patent to Thompson, 2,204,872, issued June 18, 1940. As is known, this governor delivers oil to conduit 142 at pressure which is a function of car speed throughout the upper range of speed, and delivers oil to conduit 144 at pressure which is a function of car speed throughout the lower range of speed. These pressures are one of the influences which control the application and release of the brake 48 and clutches 12 and 30 as will be explained.

The system includes a manually operated selector valve 150 for determining neutral, low range forward, high range forward and reverse; a 1–2 shift valve 152 which effects first or second speed by releasing or engaging the converter lock up clutch 12; a 2–3 shift valve 154 which effects either second speed by engaging low brake 48 while releasing planetary lock up clutch 30 or third speed or direct drive by releasing the brake 48 while engaging clutch 30; and a second pressure regulator valve 156, called throttle valve, which influences shifting of gear ratios according to torque demand on the engine as indicated by the amount of engine throttle opening.

The bore of the manual valve 150 is supplied with oil at regulated pressure from the main line 106, and in both forward drive positions of the valve, oil can flow from the bore through conduit 162 around valve 154 thence by conduit 164 around valve 152, thence by conduit 166 to throttle valve 156.

The throttle valve includes a plunger or stem 167 having lands 168 and 169, the latter also forming a piston for the regulating chamber 170. Oil at main line pressure from conduit 166 enters the regulated pressure chamber 171 wherein the pressure is reduced by the action of the regulating chamber 170, which is connected to the regulated chamber 171 by conduit 172. Conduit 174 conducts oil to the control system at the pressures maintained by the throttle valve. The valve stem 167 is urged right as FIG. 4 is seen, by a spring 176 which abuts against a plunger 178, which is urged to the right by the engine throttle operating mechanism 179 as the throttle is opened to impress through spring 176 on valve stem 167 a force which is a function of the throttle opening. The extent of movement of the plunger 178 toward the right, against spring 176 is therefore an indication of measurement of torque demand on the engine. As is known, pressure in chamber 170 urges the valve stem 167 to the left, so that land 169 tends to overlap conduit 166 and land 168 tends to uncover a vent port 180. The pressure required to close the conduit 166 and open exhaust port 180 is dependent upon the force of the spring which is in turn dependent on throttle opening and this maintains in chamber 171 and line 174 a pressure which is a function of the throttle opening, herein called T-V pressure.

The line 174 is connected to chamber 116 of the main pressure regulating valve 108 and urges this valve closed with a force proportional to throttle pressure. This adjusts the value of the regulated pressure in the main line 106 according to throttle opening.

The 1–2 shift valve 152 has a plunger or stem 182 which includes a piston 184, a land 186, and a piston 188. This plunger is urged to the right as FIG. 4 is seen by a spring 190 seated on T-V pressure piston 192, slidable in a chamber 194. The T-V pressure conduit 174 is connected to the space to left of piston 192 so that the force with which the valve is urged to the right is regulated by the amount of throttle opening. The valve stem 182 is urged to the left by a force which is a function of the speed of the car, this force being supplied by low speed governor pressure from line 144 admitted to the chambers 196 and 198 at the right of pistons 188 and 184, respectively.

The 1–2 shift valve 152 constitutes a means for engaging the converter lockup clutch 12 in response to increasing car speed as delayed by throttle opening so that the clutch 12 is engaged to place the transmission in second speed automatically in response to the speed of the car and the torque demand on the engine. Whenever the valve 152 is in the position shown in FIG. 4 the clutch 12 is disengaged because the conduit 200 connected to the servo 260 is vented through the valve 152 at exhaust port 202. Whenever the valve 152 is moved to the left by the governor pressure against the spring 190 and throttle pressure, the piston 188 closes exhaust port 202 and the land 186 connects oil supply conduit 164 with conduit 200 to fill the servo 260 and apply the clutch 12. The pressure with which the clutch 12 will be engaged will depend on throttle opening which influences the pressure in the regulator valve 108 so that at wide throttle openings indicating high torque demand the clutch is engaged with a higher pressure than at low throttle openings.

The 2–3 shift valve 154 has a plunger or stem 206 including a piston 208, a land 210, a second land 212, and a piston 214. The plunger 206 is urged to the right by a spring 220 seated against a lockout piston 222 slidable in a chamber 224, explained further below. The T-V conduit 174 is connected to the chamber 224 between the pistons 222 and 208 so that throttle pressure assists the spring 220 in urging the valve 154 to the right to delay shift from second to third speed in accordance with the amount of throttle opening. The valve 154 can be urged to the left against the force of the spring and T-V pressure by the force of high speed governor pressure from conduit 142 acting in the chamber 226 on the right of piston 208 and also by the force of low speed governor pressure from conduit 144 acting in the chamber 228 at the right of piston 214.

The 2–3 shift valve 154 operates like the 1–2 shift valve 152 in response to car speed and throttle opening either to engage brake 48 and release clutch 30 or to release brake 48 and engage clutch 30. When the valve is in the position shown in FIG. 4 the brake 48 is set because the brake apply conduit 230, which is connected to the servo 250, is supplied with oil at main line pressure from the manual valve by conduits 162, 164, 232. Likewise, the clutch 30 is disengaged because the clutch apply conduit 234 is connected to exhaust port 236 by the space around stem 206. Whenever the stem of valve 154 is moved to the left by governor pressure against the spring 220 and the force of the throttle pressure in chamber 224, the land 212 comes between exhaust port 236 and clutch apply conduit 234 and the land 210 admits oil at main line pressure from passage 162 to conduit 234. Simultaneously piston 214 blocks the supply passage 232 and brake apply conduit 230 is connected to exhaust port 236 to release the brake 48.

The manual valve 150 includes a plug 238 having a groove 240 to receive an operating member not shown, and spaced lands 242 and 244.

*Operation of controls—Neutral.*—When the manual valve is placed with the center of the groove 240 opposite the line N in FIG. 4 the land 244 blocks the main line 106 so that no oil can reach any of the above described control devices and land 242 is placed at the left of exhaust port 246 so that the conduit 162 is connected to this exhaust port. Consequently, the servos operating the brake and clutches are vented and these friction devices are released. When the car is standing and the engine is running, both shift valves 152 and 154 are in the position shown in FIG. 4, because there is no governor pressure to urge them to the left. The apply line 230 for the brake 48, shown at the right of FIG. 4, is vented by connection through passages 232, 164 and 162 to exhaust port 246 in the manual valve. The apply line 234 for the planetary lockup clutch 30, shown at the left of FIG. 4, is connected to exhaust port 236 of the 2–3 valve 154. The apply line 200 for the converter lockup clutch 12, shown at the right of FIG. 4, is connected to exhaust port 202 of the 1–2 valve 152.

*Low range.*—For driving in low range the manual valve is placed as shown in FIGS. 3 and 4. This sets the low brake 48 to place the transmission in low range because brake apply line 230 is supplied with oil through passages 232, 164 and 162 from the manual valve which is supplied by the main line 106. Opening of the engine throttle will now drive the car in low range which at first will be in first speed in which the torque converter 16 drives the torque converter output shaft 28 to rotate the ring gear 32 while the reaction sun gears 38 and 52 are held by the brake 48 to rotate the output shaft 62 at the lowest speed. When the speed of the car has sufficiently increased and the torque demand on the engine has sufficiently decreased the 1–2 shift valve will be moved to the left as FIG. 4 is seen, by governor pressure in chambers 196 and 198 against spring 190 and throttle pressure in chamber 194, as above described, and when so moved will supply oil from passage 166 through line 200 to chamber 260 and engage the torque converter lockup clutch 12 to place the car in second speed. When the manual valve is in low range the transmission cannot be shifted to third speed because the 2–3 shift valve 154 is held in the position shown in FIG. 4 by main line pressure from the manual valve through line 247 which holds the lockout piston 222 to the right compressing spring 220 to hold the shift valve 154 in the right hand position despite any increase in governor pressure that can occur.

*High range.*—For high range the manual valve is placed with the center of the groove 240 opposite the line H in FIG. 4 under which conditions the shift valves will be supplied with oil through passage 162, as previously described, and exhaust port 246 will be blocked by the land 242. The land 244 will move to the left of the port leading to line 247 so that oil pressure is cut off from the lockout piston 222 and the space to the left of the piston is vented through line 247 and the open end 252 of the bore of the manual valve. Consequently, the 2–3 shift 154 is free to operate under the influence of throttle pressure and governor pressure and when the speed of the car increases sufficiently, and the torque demand on the engine has decreased sufficiently, the valve 154 will be moved to the left. In this position the land 214 cuts off the supply of oil from passage 232 to the apply line 230 for the brake 48 and this apply line is vented at exhaust port 236. Simultaneously, the land 212 will move to the left of exhaust port 236 and land 210 will permit oil to flow from passage 162 to apply line 234 for the planetary lockup clutch actuator 248. This will place the transmission in third speed or direct drive.

If when operating in direct drive the car speed decreases sufficiently and the throttle is opened sufficiently, the shift valve 154 will again move to the right and place the car in second speed. If the speed of the car decreases still further or the T-V pressure increases still more the 1–2 shift valve 152 can be moved to the right to place the transmission in first speed. The areas of the pistons 184, 188, 192, 208 and 214 are so chosen and the pressures of the governor are so calibrated that as the speed of the car increases or as T-V pressure decreases the 1-2 shift valve 152 will always move to the left before the 2-3 shift valve 154, and if the transmission is in third speed then as the speed of the car decreases or T-V pressure increases the shift 154 will always move to the right before the shift valve 152.

It is desirable, in shifting from second to third speed, to prevent release of brake 48 before the clutch 30 is engaged to prevent engine run-away in the shift interval. It is also desirable in shifting from third to second speed to provide an interval between release of the clutch and engagement of the brake to allow the engine to speed up. These results can be accomplished by a timing accumulator, shown in FIG. 3. This includes a cylinder 254 connected to the brake apply line 230, a piston 256 and a spring 258 which urges the piston to empty the cylinder. When the brake 48 is to be applied by movement of the 2-3 shift valve from left to right the flow of oil into the cylinder 254 delays the building up of sufficient pressure in the brake servo 250 to apply the brake. When the brake 48 is to be released by movement of the 2-3 shift valve from right to left the relatively large volume of liquid in the cylinder requires time to flow from the cylinder and this maintains for a time holding pressure in servo 250 which delays release of the brake until the pressure in clutch servo 248 is built up enough to apply clutch 30.

*Reverse.*—Whenever the car is moving forward a reverse lockout relay prevents the transmission from being placed in reverse even if the manual valve should be moved by accident to the reverse position. As shown in FIG. 5 the reverse servo 270 which operates the reverse brake 58 in FIG. 1 can be supplied with oil from the reverse port 272 of the manual valve when the relay valve 274 is in the position shown in FIG. 5 at which time it connects the portions 276 and 278 of the reverse apply line through groove 280. The relay valve 274 is held in this position by the spring 282 provided the car is not moving forward, so that there is no pressure in conduit 132 because the rear pump 130 is not delivering oil. This pump is of a type which pumps only when rotating forward. Consequently, when the car is stationary and the manual valve is moved to the reverse position the reverse servo 270 can be energized to start the car backward, but if the manual valve should be placed in reverse while the car is moving forward pressure from the rear pump in line 132 holds the piston 274 in the position shown in FIG. 4 so that the reverse apply line 276-8 is interrupted.

I claim:

1. A transmission comprising in combination a hydrodynamic torque converter having an input shaft driving an impeller and having a turbine; means for driving the input shaft from an engine; means for indicating the torque demand on the engine; a first planetary gearset and a second planetary gearset each having a sun gear, a ring gear and planet gears journalled on a carrier; the first carrier being connected to the second ring gear, the second carrier being connected to an output shaft, and the sun gears being connected together; a driving connection between the turbine and the first ring gear; a first clutch adapted when engaged to connect the input shaft and the first ring gear; a second clutch adapted when engaged to connect the first ring gear to the sun gears; a brake adapted when engaged to hold the sun gears fast; a fluid pressure operator for each of said brake and clutches; a source of fluid under pressure; a first valve for directing pressure fluid from the source to said brake operator to establish a combined hydrokinetic and geared speed-reducing drive from the input to the output shaft; a second valve operatively connected to said means for indicating the torque demand on the engine and the output shaft and responsive jointly to the torque demand on the engine and to the speed of the output shaft for directing pressure fluid to the first clutch operator to establish a reduced speed geared drive from the input shaft to the output shaft; and a third valve operatively connected to said means for indicating the torque demand on the engine and the output shaft and responsive jointly to the torque demand on the engine and to a higher speed of the output shaft for directing pressure fluid to the second clutch operator and for interrupting the supply of pressure fluid from said source through said first valve to said brake operator to disestablish said geared speed-reducing drive and thereby establish a one-to-one drive connection between the input and the output shafts.

2. A transmission comprising in combination a hydrodynamic torque converter having an input shaft driving an impeller and having a turbine; means for driving the input shaft from an engine; means for indicating the torque demand on the engine; a first planetary gearset and a second planetary gearset each having a sun gear, a ring gear and planet gears journalled on a carrier; the first carrier being connected to the second ring gear, the second carrier being connected to an output shaft, and the sun gears being connected together; a driving connection between the turbine and the first ring gear; a first clutch adapted when engaged to connect the input shaft and the first ring gear; a second clutch adapted when engaged to connect the first ring gear to the sun gears; a brake adapted when engaged to hold the sun gears fast; a fluid pressure operator for each of said brake and clutches; a source of fluid under pressure; a first valve adapted in one position to direct pressure fluid from the source to said brake operator to establish a combined hydrokinetic and geared speed-reducing drive from the input to the output shaft; a second valve operatively connected to said means for indicating the torque demand on the engine and the output shaft and responsive jointly to the torque demand on the engine and to the speed of the output shaft for directing pressure fluid to the first clutch operator to establish a reduced speed geared drive from the input shaft to the output shaft; and a third valve operatively connected to said means for indicating the torque demand on the engine and the output shaft and responsive jointly to the torque demand on the engine and to a higher speed of the output shaft for directing pressure fluid to the second clutch operator and for interrupting the supply of pressure fluid from said source through said first valve to said brake operator to disestablish said geared speed-reducing drive and thereby establish a one-to-one drive connection between the input and the output shafts, the first valve being adapted when in a second position to prevent response of the third valve to the speed of the output shaft and to prevent said third valve directing pressure to the second clutch.

3. A transmission comprising in combination a hydrodynamic torque converter having an input shaft driving an impeller and having a turbine; means for driving the input shaft from an engine; means for indicating the torque demand on the engine; a first planetary gearset and a second planetary gearset each having a sun gear, a ring gear and planet gears journalled on a carrier; the first carrier being connected to the second ring gear, the second carrier being connected to an output shaft, and the sun gears being connected together; a driving connection between the turbine and the first ring gear; a first clutch adapted when engaged to connect the input shaft and the first ring gear; a second clutch adapted when engaged to connect the first ring gear to the sun gears; a brake adapted when engaged to hold the sun gears fast; a fluid pressure operator for each of said brake and clutches; a source of fluid under pressure; a manually operated valve adapted to direct pressure fluid from the source to the brake operator to establish a combined hydrokinetic and geared speed-reducing drive from the input to the output shaft; a first shift valve adapted when open to direct pressure fluid from the source to the first clutch operator; a second source of pressure measured by the speed of the output shaft adapted to urge the first shift valve open; a third source of pressure determined by said means for indicating the torque demand on the engine adapted to urge the first shift valve closed; a second shift valve adapted in a first position to direct pressure fluid from the first source to the second clutch operator and to interrupt communication from the first source through the manual valve to the brake operator to disengage the brake, and adapted when in a second position to prevent communication between the first source and the second clutch operator and provide communication between said first source through said manual valve to said brake operator to engage the brake; pressure-responsive means connected to the second source for urging the second shift valve toward its first position; and pressure-responsive means connected to the third source for urging the second shift valve toward its second position.

4. A transmission comprising in combination a hydrodynamic torque converter having an input shaft driving an impeller and having a turbine; means for driving the input shaft from an engine; means for indicating the torque demand on the engine; a first planetary gearset and a second planetary gearset each having a sun gear, a ring gear and planet gears journalled on a carrier; the first carrier being connected to the second ring gear, the second carrier being connected to an output shaft, and the sun gears being connected together; a driving connection between the turbine and the first ring gear; a first clutch adapted when engaged to connect the input shaft and the first ring gear; a second clutch adapted when engaged to connect the first ring gear to the sun gears; a brake adapted when engaged to hold the sun gears fast; a fluid pressure operator for each of said brake and clutches; a source of fluid under pressure; a manually operated valve adapted in one position to direct pressure fluid from the source to the brake operator to establish a combined hydrokinetic and geared speed-reducing drive from the input to the output shaft; a first shift valve adapted when open to direct pressure fluid from the source to the first clutch operator; a second source of pressure determined by the speed of the output shaft adapted to urge the first shift valve open; a third source of pressure determined by said means indicating the torque demand on the engine adapted to urge the first shift valve closed; a second shift valve adapted in a first position to direct pressure fluid from the first source to the second clutch operator and to interrupt communication between the first source and the brake operator, and adapted when in a second position to prevent communication between the first source and the second clutch operator; first pressure-responsive means connected to the second source for urging the second shift valve toward its first position; second pressure-responsive means connected to the third source for urging the second shift valve toward its second position, and the manual valve having means for connecting, when in a second position, the first source of pressure to the second pressure-responsive means on the second shift valve.

5. A transmission comprising in combination a hydrodynamic torque converter having an input member driving an impeller and having a turbine; means for driving the input member from an engine; means for indicating the torque demand on the engine; and means including gearing and connecting means connecting the turbine to said gearing and said gearing to the output member and clutch means connecting said input member to said gearing to lockup said torque converter and also including a first drive operator means actuated by fluid pressure operative to provide a low gear ratio drive in said gearing, a second drive operator means actuated by fluid pressure operative to engage said clutch means to provide direct drive, and a third drive operator means actuated by fluid pressure to provide a high gear ratio in said gearing; a source of fluid under pressure; a manually operated valve adapted in one position to direct pressure fluid from the source to said first drive operator means to establish a combined hydrokinetic and geared low gear ratio drive from the input to the output shaft; a first shift valve adapted when open to direct pressure fluid from the source to said second drive operator means; a second source of pressure determined by the speed of the output shaft adapted to urge the first shift valve open; a third source of pressure determined by said means indicating the torque demand on the engine adapted to urge the first shift valve closed; a second shift valve adapted in a first position to direct pressure fluid from the first source to said third drive operator means and to interrupt communication between the first source and said first drive operator means, and adapted when in a second position to prevent communication between the first source and said third drive operator means; first pressure-responsive means connected to the second source for urging the second shift valve toward its first position, second pressure-responsive means connected to the third source for urging the second shift valve toward its second position, and the manual valve having means for connecting, when in a second position, the first source of pressure to the second pressure-responsive means on the second shift valve to hold said second shift valve in said first position.

6. A transmission comprising in combination a hydrodynamic torque converter having an input member driving an impeller and having a turbine; means for driving said input member from an engine; means for indicating the torque demand on the engine; and means including gearing connecting the turbine to the output member and a clutch connecting said input member to said gearing to lockup said torque converted and also including a first drive operator means actuated by fluid pressure operative to provide a low gear ratio drive in said gearing, a second drive operator means actuated by fluid pressure operative to engage said clutch to provide direct drive, and a third drive operator means actuated by fluid pressure to provide a high gear ratio in said gearing; a source of fluid under pressure; a supply passage; a manually operated valve adapted in one position to direct pressure fluid from said source to said supply passage; a first shift valve adapted to upshift to an open position and when open to direct pressure fluid from said source to said second drive operator means; a second source of pressure determined by the speed of said output member adapted to urge said first shift valve open; a third source of pressure determined by said means indicating the torque demand on the engine adapted to urge said first shift valve closed; a second shift valve adapted in a first position to direct pressure fluid from said first source to said third drive operator means and to interrupt communication between said first source and said first drive operator means, and adapted when in a second position to prevent communication between the first source and said third drive operator means and permit communication between said supply passage and said first drive operator means to engage said low gear drive; first pressure-responsive means connected to said second source for urging the second shift valve toward its first position; second pressure-responsive means connected to said third source for urging said second shift valve toward its second position; said first shift valve being upshifted at a lower second source pressure and lower output member speed than said second shift valve to provide an initial torque converter low gear drive and then on upshift of said first shift valve a direct drive low gear drive and then on upshift of said second shift valve a direct drive high gear drive; and said manual valve having means for also connecting, when in a second position, said first source of pressure to said supply passage and said second pressure-responsive means on said second shift valve to hold said second shift valve in said first position to prevent engagement of said high gear ratio while permitting upshift of said first shift valve to engage said clutch.

7. In a transmission, the combination of a drive member, a driven member, means for driving said input member from an engine, means for indicating the torque demand on the engine, means for providing a first power train between said members and including a fluid operated engaging device for completing the train, means for providing a second power train between said members and including a fluid operated engaging device for completing the power train, a first source of fluid pressure, a second source of fluid pressure determined by the speed of said output member, a third source of fluid pressure determined by said means indicating the torque demand on the engine, a shift valve having a first position connecting said first source to one engaging device and a second position connecting said first source to the other engaging device, a first fluid pressure responsive device operatively connected to said shift valve to move said shift valve from said first to said second position actuated by said second source, a second fluid pressure responsive device operatively connected to said shift valve to move said shift valve from said second to said first position normally actuated by said third source including cutoff means operative to block the supply from said third source to said second fluid pressure responsive device, a manual valve operative in one control position to connect said first source to said second fluid pressure responsive device to actuate said cutoff means to act to cut off the flow of said third source to said second pressure responsive device and to act on said second pressure responsive device to act on said shift valve and to move said shift valve from said second to said first position only in response to fluid pressure of said first source.

References Cited in the file of this patent

UNITED STATES PATENTS

| | | |
|---|---|---|
| 2,645,135 | Frank | July 14, 1953 |
| 2,667,085 | Ackerman | Jan. 26, 1954 |
| 2,734,399 | Christenson | Feb. 14, 1956 |
| 2,778,678 | Sheppard | Apr. 16, 1957 |

OTHER REFERENCES

"Automobile Engineer," December 1941 (pages 443–447).